US010612383B2

(12) United States Patent
Moniz et al.

(10) Patent No.: US 10,612,383 B2
(45) Date of Patent: Apr. 7, 2020

(54) COMPRESSOR AFT ROTOR RIM COOLING FOR HIGH OPR (T3) ENGINE (71) Applicant: General Electric Company, Schenectady, NY (US)

(72) Inventors: Thomas Ory Moniz, Loveland, OH (US); Joseph George Rose, Mason, OH (US)

(73) Assignee: General Electric Company, Schenectady, NY (US)

( * ) Notice: Subject to any disclaimer, the term of this patent is extended or adjusted under 35 U.S.C. 154(b) by 755 days.

(21) Appl. No.: 15/007,257

(22) Filed: Jan. 27, 2016

(65) Prior Publication Data
US 2017/0211590 A1 Jul. 27, 2017

(51) Int. Cl.
*F01D 5/08* (2006.01)
*F04D 29/58* (2006.01)
*F01D 5/30* (2006.01)
*F02C 7/18* (2006.01)
*F04D 29/32* (2006.01)
*F04D 29/54* (2006.01)

(52) U.S. Cl.
CPC ............ *F01D 5/085* (2013.01); *F01D 5/082* (2013.01); *F01D 5/084* (2013.01); *F01D 5/087* (2013.01); *F01D 5/3007* (2013.01); *F02C 7/18* (2013.01); *F04D 29/321* (2013.01); *F04D 29/542* (2013.01); *F04D 29/582* (2013.01); *F04D 29/584* (2013.01); *F05D 2220/32* (2013.01); *F05D 2240/30* (2013.01); *F05D 2260/20* (2013.01); *Y02T 50/676* (2013.01)

(58) Field of Classification Search
CPC ...... F01D 5/025; F01D 5/3023; F01D 5/3007; F01D 5/303; F01D 5/085
See application file for complete search history.

(56) References Cited

U.S. PATENT DOCUMENTS 2,618,433 A 11/1952 Loos et al.
2,656,147 A * 10/1953 Brownhill ............... F01D 5/084
416/97 R
(Continued)

FOREIGN PATENT DOCUMENTS

CN 101845970 A 9/2010
EP 1 394 358 A2 3/2004
(Continued)

OTHER PUBLICATIONS

Machine Translation and First Office Action and Search issued in connection with corresponding CN Application No. 201710055903.3 dated Feb. 12, 2018.
(Continued)

Primary Examiner — Eldon T Brockman
(74) Attorney, Agent, or Firm — Dority & Manning, P.A.

(57) ABSTRACT

In one aspect, the present disclosure is directed to a cooling circuit for a gas turbine engine. The cooling circuit includes a rotor blade having a connection portion and a rotor disc having a first axial side and a second axial side. The rotor disc defines a connection slot and a cooling passage extending between the first axial side and the second axial side. The connection slot receives the connection portion to couple the rotor blade to the rotor disc. Cooling air flows through the cooling passage.

17 Claims, 5 Drawing Sheets

(56) References Cited

U.S. PATENT DOCUMENTS

| | | | | |
|---|---|---|---|---|
| 3,647,313 | A * | 3/1972 | Koff | F01D 5/084 |
| | | | | 415/115 |
| 4,344,738 | A * | 8/1982 | Kelly | F01D 5/3007 |
| | | | | 416/95 |
| 4,576,547 | A * | 3/1986 | Weiner | F01D 11/24 |
| | | | | 415/116 |
| 4,582,467 | A | 4/1986 | Kisling | |
| 4,719,747 | A * | 1/1988 | Willkop | F01D 5/066 |
| | | | | 415/115 |
| 4,793,772 | A * | 12/1988 | Zaehring | F01D 5/081 |
| | | | | 415/175 |
| 4,795,307 | A * | 1/1989 | Liebl | F01D 5/085 |
| | | | | 415/115 |
| 4,920,741 | A * | 5/1990 | Liebl | F02C 7/18 |
| | | | | 415/115 |
| 5,232,339 | A * | 8/1993 | Plemmons | F01D 5/084 |
| | | | | 415/177 |
| 5,271,711 | A * | 12/1993 | McGreehan | F01D 5/085 |
| | | | | 415/115 |
| 5,297,386 | A * | 3/1994 | Kervistin | F01D 11/24 |
| | | | | 415/115 |
| 5,593,274 | A | 1/1997 | Carreno et al. | |
| 5,685,158 | A * | 11/1997 | Lenahan | F01D 5/081 |
| | | | | 416/95 |
| 5,779,436 | A | 7/1998 | Glezer et al. | |
| 6,749,400 | B2 * | 6/2004 | Dougherty | F01D 5/081 |
| | | | | 415/115 |
| 7,448,221 | B2 * | 11/2008 | Suciu | F01D 5/066 |
| | | | | 415/141 |
| 7,581,920 | B2 * | 9/2009 | Lardellier | F01D 5/145 |
| | | | | 415/1 |
| 7,993,102 | B2 | 8/2011 | Desai et al. | |
| 8,186,933 | B2 * | 5/2012 | Doss | F01D 5/066 |
| | | | | 415/1 |
| 8,277,190 | B2 * | 10/2012 | Piersall | F01D 5/3007 |
| | | | | 416/210 R |
| 8,616,827 | B2 | 12/2013 | O'Leary | |
| 8,721,264 | B2 | 5/2014 | Behaghel et al. | |
| 8,894,360 | B2 | 11/2014 | Pegouet | |
| 8,961,132 | B2 * | 2/2015 | Suciu | F01D 11/006 |
| | | | | 416/198 A |
| 8,979,470 | B2 * | 3/2015 | Riazantsev | F01D 5/084 |
| | | | | 415/1 |
| 8,992,168 | B2 | 3/2015 | Norris et al. | |
| 9,091,173 | B2 | 7/2015 | Mosley et al. | |
| 9,664,118 | B2 * | 5/2017 | Tyagi | F02C 9/18 |
| 9,771,802 | B2 * | 9/2017 | Ross | F01D 5/082 |
| 10,161,251 | B2 * | 12/2018 | Bintz | F01D 5/081 |
| 2004/0042900 | A1 * | 3/2004 | Dougherty | F01D 5/081 |
| | | | | 416/97 R |
| 2006/0222485 | A1 * | 10/2006 | Lardellier | F01D 5/145 |
| | | | | 415/115 |
| 2009/0110561 | A1 * | 4/2009 | Ramerth | F01D 5/082 |
| | | | | 416/96 R |
| 2010/0178168 | A1 | 7/2010 | Desai et al. | |
| 2013/0280028 | A1 | 10/2013 | Benjamin et al. | |
| 2015/0114000 | A1 * | 4/2015 | Tyagi | F02C 9/18 |
| | | | | 60/785 |
| 2015/0240644 | A1 * | 8/2015 | Ross | F01D 5/082 |
| | | | | 415/177 |
| 2016/0076378 | A1 * | 3/2016 | Bintz | F01D 5/081 |
| | | | | 416/95 |

FOREIGN PATENT DOCUMENTS

| | | | | |
|---|---|---|---|---|
| EP | 2 055 895 A2 | 5/2009 | | |
| EP | 2 436 879 A2 | 4/2012 | | |
| GB | 643212 A * | 9/1950 | | F01D 5/3023 |
| JP | S59203809 | 11/1984 | | |
| JP | H0814164 | 1/1996 | | |
| JP | H10266802 | 10/1998 | | |

OTHER PUBLICATIONS

Extended European Search Report and Opinion issued in connection with corresponding EP Application No. 17152627.0 dated Sep. 6, 2017.

Machine Translation and Second Office Action and Search issued in connection with corresponding CN Application No. 201710055903.3 dated Nov. 5, 2018.

Chinese Office Action and English Translation thereof, CN Application No. 201710055903.3, dated Jun. 3, 2019, 19 pages.

* cited by examiner

COMPRESSOR AFT ROTOR RIM COOLING FOR HIGH OPR (T3) ENGINE

FIELD OF THE INVENTION

The present disclosure relates generally to a gas turbine engine and, more particularly, to a cooling circuit for a gas turbine engine.

BACKGROUND OF THE INVENTION

A gas turbine engine generally includes, in serial flow order, an inlet section, a compressor section, a combustion section, a turbine section, and an exhaust section. In operation, air enters the inlet section and flows to the compressor section where one or more axial compressors progressively compress the air until it reaches the combustion section. Fuel mixes with the compressed air and burns within the combustion section, thereby creating combustion gases. The combustion gases flow from the combustion section through a hot gas path defined within the turbine section and then exit the turbine section via the exhaust section.

In particular configurations, the compressor section includes, in serial flow order, a low pressure compressor ("LP compressor") and a high pressure compressor ("HP compressor"). The LP compressor and the HP compressor may include one or more axially spaced apart stages. Each stage may include a row of circumferentially spaced apart stator vanes and a row of circumferentially spaced apart rotor blades positioned downstream of the row of stator vanes. The stator vanes direct the air flowing through the compressor section onto the rotor blades, which impart kinetic energy into the air to increase the pressure thereof.

In general, it is desirable for gas turbine engines to have a high overall pressure ratio ("OPR"), the ratio of the stagnation pressure at the front and the rear of the compressor section. Typically, a higher OPR is indicative of higher gas turbine efficiency. High OPRs, however, result in high compressor discharge temperatures and high temperatures in the aft or downstream stages of the compressor section.

The rotor blades may be constructed from materials that limit the OPR of the gas turbine engine. That is, the material properties of the rotor blades limit the temperatures that the compressor may experience. In this respect, the material properties of the rotor blades may hinder the efficiency of the gas turbine engine. Accordingly, a gas turbine engine having a cooling circuit that permits increased compressor temperatures would be welcomed in the technology.

BRIEF DESCRIPTION OF THE INVENTION

Aspects and advantages of the invention will be set forth in part in the following description, or may be obvious from the description, or may be learned through practice of the invention.

In one aspect, the present disclosure is directed to a cooling circuit for a gas turbine engine. The cooling circuit includes a rotor blade having a connection portion and a rotor disc having a first axial side and a second axial side. The rotor disc defines a connection slot and a cooling passage extending between the first axial side and the second axial side. The connection slot receives the connection portion to couple the rotor blade to the rotor disc. Cooling air flows through the cooling passage.

A further aspect of the present disclosure is directed to a gas turbine engine having a compressor section, a combustion section, and a turbine section. The compressor section includes a row of stator vanes and a row of rotor blades, which define a compressed gas path. Each rotor blade includes a connection portion and a rotor disc having a first axial side and a second axial side. The rotor disc defines a cooling passage extending between the first axial side and the second axial side and one or more connection slots that receive the connection portions of the rotor blades to couple the rotor blades to the rotor disc. A spacer couples to the rotor disc and is in sliding contact with the row of stator vanes. The spacer defines an intake port extending therethrough in fluid communication with the cooling passage. Cooling air from the compressed gas path flows through the intake port into the cooling passage.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended Figs., in which.

Repeat use of reference characters in the present specification and drawings is intended to represent the same or analogous features or elements of the present invention.

DETAILED DESCRIPTION OF THE INVENTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment.

Thus, it is intended that the present invention covers such modifications and variations as come within the scope of the appended claims and their equivalents.

As used herein, the terms "first", "second", and "third" may be used interchangeably to distinguish one component from another and are not intended to signify location or importance of the individual components.

The terms "upstream" and "downstream" refer to the relative direction with respect to fluid flow in a fluid pathway. For example, "upstream" refers to the direction from which the fluid flows, and "downstream" refers to the direction to which the fluid flows.

Figure 1:
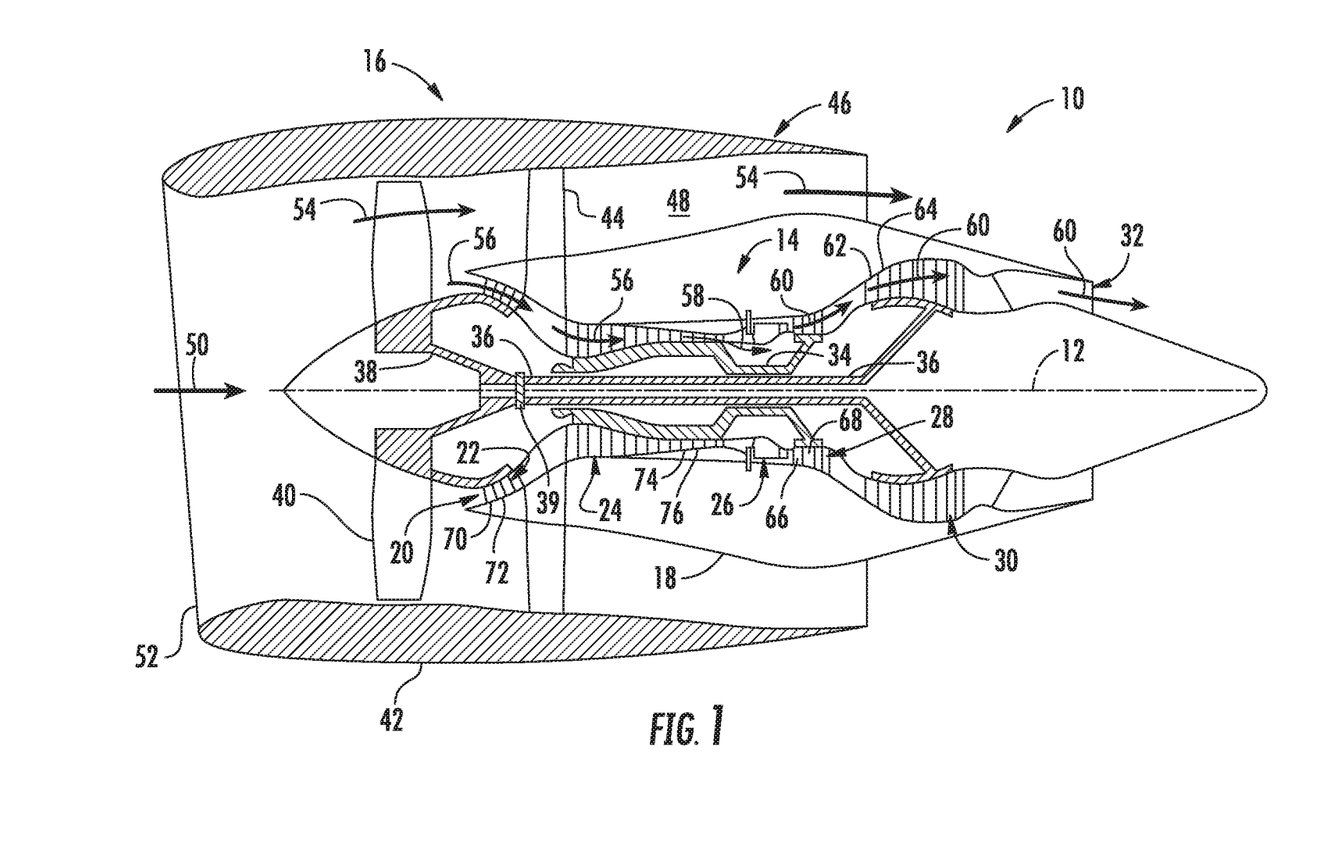
FIG. 1 is a schematic cross-sectional view of an exemplary high-bypass turbofan-type gas turbine engine in accordance with the embodiments disclosed herein.

Referring now to the drawings, wherein identical numerals indicate the same elements throughout the figures, FIG. 1 is a schematic cross-sectional view of an exemplary high-bypass turbofan-type gas turbine engine 10 ("turbofan 10") as may incorporate various embodiments disclosed herein. As shown in FIG. 1, the turbofan 10 defines a longitudinal or axial centerline axis 12 extending therethrough for reference. In general, the turbofan 10 may include a core turbine or gas turbine engine 14 disposed downstream from a fan section 16.

The core turbine engine 14 may generally include a substantially tubular outer casing 18 that defines an annular inlet 20. The outer casing 18 may be formed from a single casing or multiple casings. The outer casing 18 encloses, in serial flow relationship, a compressor section having a booster or low pressure compressor 22 ("LP compressor 22") and a high pressure compressor 24 ("HP compressor 24"), a combustion section 26, a turbine section having a high pressure turbine 28 ("HP turbine 28") and a low pressure turbine 30 ("LP turbine 30"), and an exhaust section 32. A high pressure shaft or spool 34 ("HP shaft 34") drivingly couples the HP turbine 28 and the HP compressor 24. A low pressure shaft or spool 36 ("LP shaft 36") drivingly couples the LP turbine 30 and the LP compressor 22. The LP shaft 36 may also couple to a fan spool or shaft 38 of the fan section 16. In some embodiments, the LP shaft 36 may couple directly to the fan shaft 38 (i.e., a direct-drive configuration). In alternative configurations, the LP shaft 36 may couple to the fan shaft 38 via a reduction gear 39 (i.e., an indirect-drive or geared-drive configuration).

As shown in FIG. 1, the fan section 16 includes a plurality of fan blades 40 coupled to and extending radially outwardly from the fan shaft 38. An annular fan casing or nacelle 42 circumferentially encloses the fan section 16 and/or at least a portion of the core turbine 14. The nacelle 42 may be supported relative to the core turbine 14 by a plurality of circumferentially-spaced apart outlet guide vanes 44. Furthermore, a downstream section 46 of the nacelle 42 may enclose an outer portion of the core turbine 14 to define a bypass airflow passage 48 therebetween.

As illustrated in FIG. 1, air 50 enters an inlet portion 52 of the turbofan 10 during operation thereof. A first portion 54 of the air 50 flows into the bypass flow passage 48, while a second portion 56 of the air 50 flows into the inlet 20 of the LP compressor 22. One or more sequential stages of LP compressor stator vanes 70 and LP compressor rotor blades 72 coupled to the LP shaft 36 progressively compress the second portion 56 of the air 50 flowing through the LP compressor 22 en route to the HP compressor 24. Next, one or more sequential stages of HP compressor stator vanes 74 and HP compressor rotor blades 76 coupled to the HP shaft 34 further compress the second portion 56 of the air 50 flowing through the HP compressor 24. This provides compressed air 58 to the combustion section 26 where it mixes with fuel and burns to provide combustion gases 60.

The combustion gases 60 flow through the HP turbine 28 where one or more sequential stages of HP turbine stator vanes 66 and HP turbine rotor blades 68 coupled to the HP shaft 34 extract a first portion of kinetic and/or thermal energy therefrom. This energy extraction supports operation of the HP compressor 24. The combustion gases 60 then flow through the LP turbine 30 where one or more sequential stages of LP turbine stator vanes 62 and LP turbine rotor blades 64 coupled to the LP shaft 36 extract a second portion of thermal and/or kinetic energy therefrom. This energy extraction causes the LP shaft 36 to rotate, thereby supporting operation of the LP compressor 22 and/or rotation of the fan shaft 38. The combustion gases 60 then exit the core turbine 14 through the exhaust section 32 thereof.

Along with the turbofan 10, the core turbine 14 serves a similar purpose and sees a similar environment in land-based gas turbines, turbojet engines in which the ratio of the first portion 54 of the air 50 to the second portion 56 of the air 50 is less than that of a turbofan, and unducted fan engines in which the fan section 16 is devoid of the nacelle 42. In each of the turbofan, turbojet, and unducted engines, a speed reduction device (e.g., the reduction gearbox 39) may be included between any shafts and spools. For example, the reduction gearbox 39 may be disposed between the LP shaft 36 and the fan shaft 38 of the fan section 16.

Figure 2:
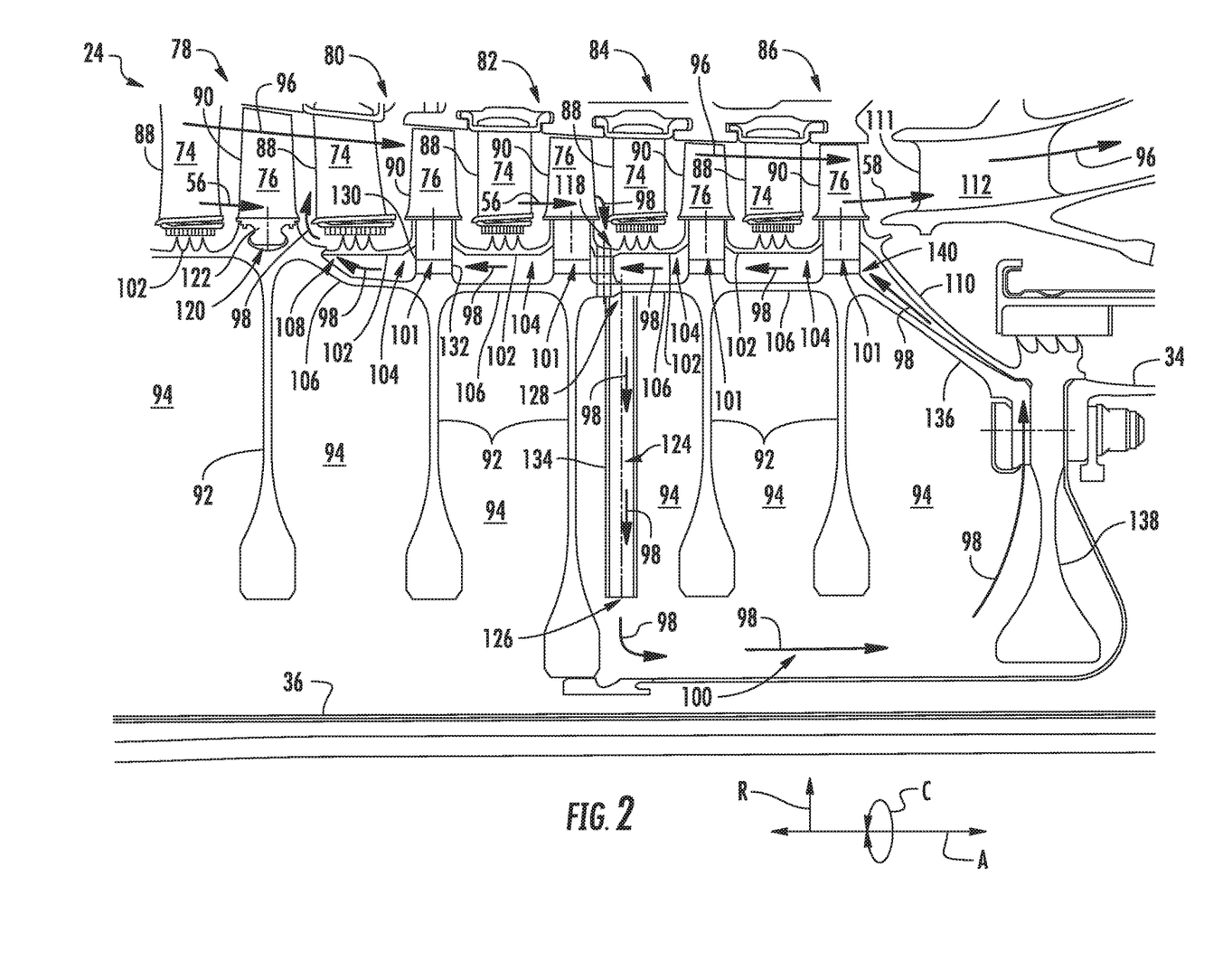
FIG. 2 is a cross-sectional side view of an HP compressor of the turbofan shown in FIG. 1, illustrating one embodiment of a cooling circuit defined thereby.

FIG. 2 illustrates the HP compressor 24 in greater detail. As depicted therein, the HP compressor 24 defines an axial direction A, a radial direction R, and a circumferential direction C. In general, the axial direction A extends generally parallel to the longitudinal axis 12, the radial direction R extends orthogonally outwardly from the longitudinal axis 12, and the circumferential direction C extends concentrically around the longitudinal axis 12.

The HP compressor 24 includes one or more sequential stages. For example, the embodiment illustrated in FIG. 2 includes a first stage 78, a second stage 80 positioned axially downstream from the first stage 78, a third stage 82 positioned axially downstream from the second stage 80, a fourth stage 84 positioned axially downstream from the third stage 82, and a fifth stage 86 positioned axially downstream from the fourth stage 84. Although, the HP compressor 24 may have more or less stages as is necessary or desired. Some embodiments of the HP compressor 24, such as the one shown in FIG. 2, include a row 111 of circumferentially spaced apart outlet guide vanes or diffuser vanes 112 positioned axially downstream from the final stage thereof (e.g., the fifth stage 86 in the embodiment shown in FIG. 2).

Each of the stages 78, 80, 82, 84, 86 include a row 88 of the stator vanes 74 and a row 90 of the rotor blades 76. The stator vanes 74 in the row 88 are circumferentially spaced apart. Similarly, the rotor blades 76 in the row 90 are also circumferentially spaced apart. In the embodiment shown in FIG. 2, the row 90 of rotor blades 76 is positioned axially downstream from the row 88 of stator vanes 74. Each of the rotor blades 76 includes a connection portion extending radially inwardly therefrom for coupling with a corresponding rotor disc 92 as will be discussed in greater detail below. The connection portion may be an axial dovetail 116 (FIG. 3), a circumferential dovetail 122 (FIG. 4), a fir tree (not shown), or any other suitable connection portion shape.

The rows 88 of the stator vanes 74 and the rows 90 of the rotor blades 76 of each of the stages 78, 80, 82, 84, 86 collectively define a compressed gas path 96 through which the second portion 56 of the air 50 flows. In particular, the stator vanes 74 direct the second portion 56 of the air 50 onto the rotor blades 76, which impart kinetic energy into the second portion 56 of the air 50. In this respect, the rotor blades 76 convert the second portion 56 of the air 50 flowing through the HP compressor 24 into the compressed air 58. The outlet guide vanes 112, if included, direct the flow of compressed air 58 into the combustion section 26.

Each of the stages 78, 80, 82, 84, 86 also include the rotor disc 92, which couples to the corresponding row 90 of rotor blades 76. In the embodiment shown in FIG. 2, the HP compressor 24 includes a compressor discharge pressure ("CDP") seal 138, which is coupled to the HP shaft 34, positioned axially downstream of the rotor disc 92 in the fifth stage 86. The radially outward end of the CDP seal 138 is positioned radially inwardly from the radially outer ends of the rotor discs 92 in the embodiment shown in FIG. 2. As such, the HP compressor 24 illustrated in FIG. 2 includes five rotor discs 92 and one CDP seal 138. Although, the HP compressor 24 may include more or less rotor discs 92 as is necessary or desired.

Each rotor disc 92 includes one or more connection slots that receive the connection portions (e.g., the axial dovetail 116, the circumferential dovetail 122, the fir tree, etc.) of the rotor blades 76 of the corresponding row 90. The rotor discs 92 in the second through fifth stages 80, 82, 84, 86 of the HP compressor 24 define a plurality of axial dovetail slots 114. As is more specifically illustrated in FIG. 3, the axial dovetail slots 114 extend in the axial direction A between a first axial surface 130 of the rotor disc 92 and a second axial surface 132 (FIGS. 2 and 4) of the rotor disc 92 positioned downstream of the first axial surface 130. Each of the plurality of axial dovetail slots 114 are circumferentially spaced apart along the rotor disc 92. In this respect, each of the axial dovetails 116 of the rotor blades 76 slide into one of the axial dovetail slots 114, thereby forming the circumferentially spaced apart row 90 of rotor blades 76. Referring again to FIG. 2, the rotor disc 92 of the first stage 76 defines a single circumferential dovetail slot 120. As is more specifically illustrated in FIG. 4, the circumferential dovetail slot 120 extends continuously and circumferentially around the rotor disc 92. In this respect, each of the circumferential dovetails 122 of the rotor blades 76 slides sequentially into the circumferential dovetail slot 120, thereby forming the circumferentially spaced apart row 90 of rotor blades 76. In alternate embodiments, however, the rotor discs 92 in the stages 78, 80, 82, 84, 86 may define axial dovetail slots 114, circumferential dovetail slots 120, fir tree slots, and/or any other suitable connection slot. Moreover, the HP compressor 24 may include any combination of axial dovetail slots 114, circumferential dovetail slots 120, fir tree slots, and/or any other suitable connection slots. In the embodiment shown in FIG. 2, the CDP seal 138 does not define a connection slot.

An annular wall 106 couples each adjacent pair of the rotor discs 92. In the embodiment shown in FIG. 2, for example, a first annular wall 106 couples the rotor discs 92 of the first and the second stages 78, 80. A second annular wall 106 couples the rotor discs 92 of the second and the third stages 80, 82. A third annular wall 106 couples the rotor discs 92 of the third and the fourth stages 82, 84. A fourth annular wall 106 couples the rotor discs 92 of the fourth and the fifth stages 84, 86. The embodiment shown in FIG. 2 further includes a conical wall 136 couples the rotor disc 92 of the fifth stage 86 and the CDP seal 138, which attaches to the HP shaft 34. In this respect, all of the rotor discs 92 rotate in unison when the HP turbine 28 drives the HP shaft 34. Furthermore, each of the annular walls 106 and the conical wall 136 in combination with each corresponding adjacent pair of rotor discs 92 and/or CDP seal 138 coupled thereby define a rotor disc space 94.

A coupling, such as a labyrinth seal 102, is also positioned between each adjacent pair of rotor discs 92. In the embodiment shown in FIG. 2, for example, a first labyrinth seal 102 is positioned between the rotor discs 92 of the first and the second stages 78, 80. A second labyrinth seal 102 is positioned between the rotor discs 92 of the second and the third stages 80, 82. A third labyrinth seal 102 is positioned between the rotor discs 92 of the third and the fourth stages 82, 84. A fourth labyrinth seal 102 is positioned between the rotor discs 92 of the fourth and the fifth stages 84, 86. The embodiment shown in FIG. 2 further includes a conical flange 110 positioned between the rotor disc 92 of the fifth stage 86 and the CDP seal 138. In this respect, the labyrinth seals 102, the rotor discs 92, and the conical flange 110 collectively define the radially inner boundary of the compressed gas path 96. The labyrinth seals 102 prevent interstage leakage of the second portion 54 of the air 50 across the compressor stages 78, 80, 82, 84, 86. Furthermore, the labyrinth seals 102 permit relative rotation between each of the rows 88 of stator vanes 74 and the adjacent rotor discs 92. This allows the rotor blades 76 to rotate, while the stator vanes 74 remain stationary. In other embodiments, the coupling may be a brush seal (not shown) or any type of suitable seal.

Each of the labyrinth seals 102 in combination with the corresponding annular wall 106 and the corresponding pair of adjacent rotor discs 92 define an annular cavity 104. Each of the annular cavities 104 is axially aligned with and positioned radially outwardly from the corresponding rotor disc space 94. Furthermore, the conical flange 110 and the conical wall 136 collectively define a generally conical cavity 140 therebetween.

Figure 3:
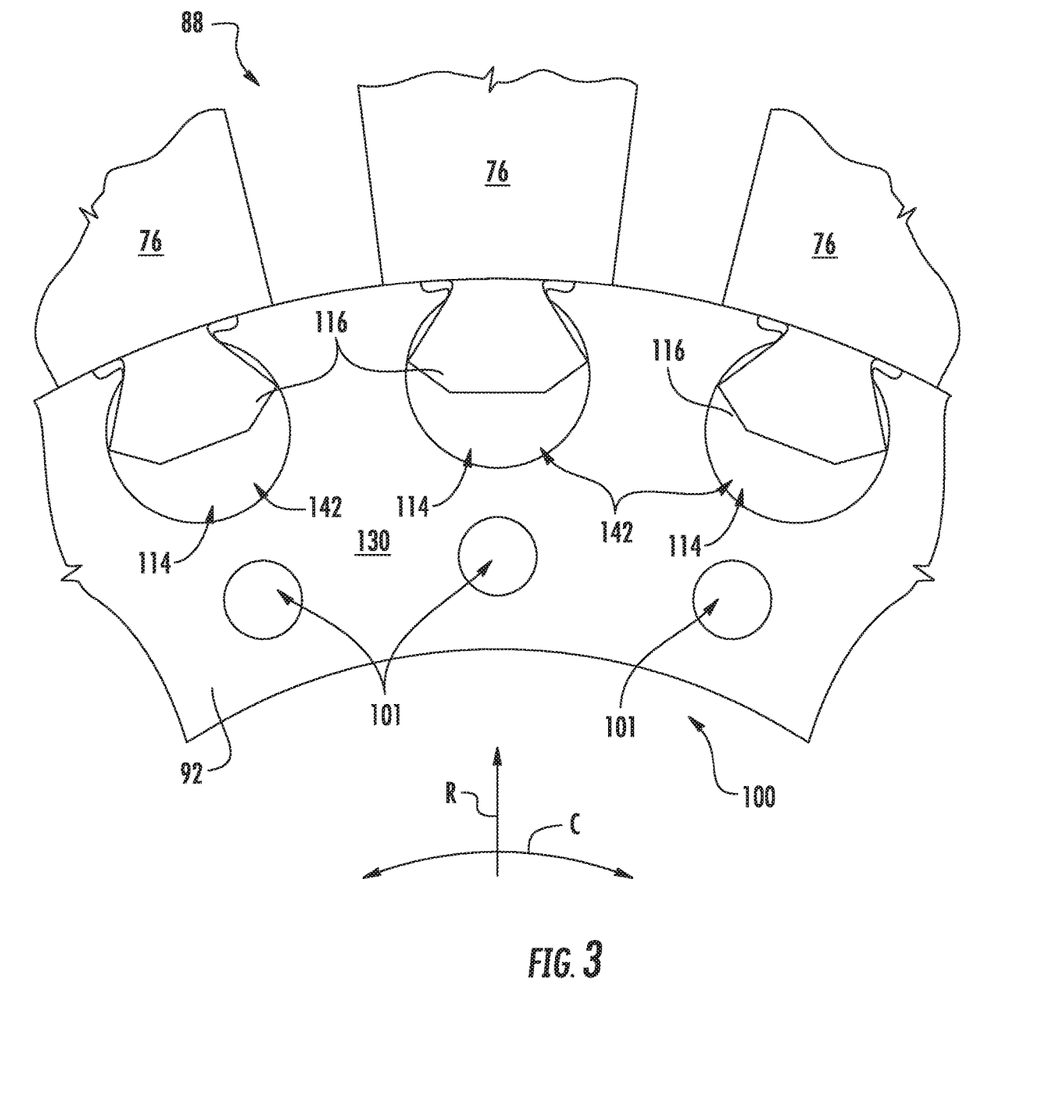
FIG. 3 is a front view of a row of rotor blades in the HP compressor shown in FIG. 2, illustrating a plurality of axial dovetails, a plurality of corresponding axial dovetail slots, and a plurality of cooling passages.
Figure 4:
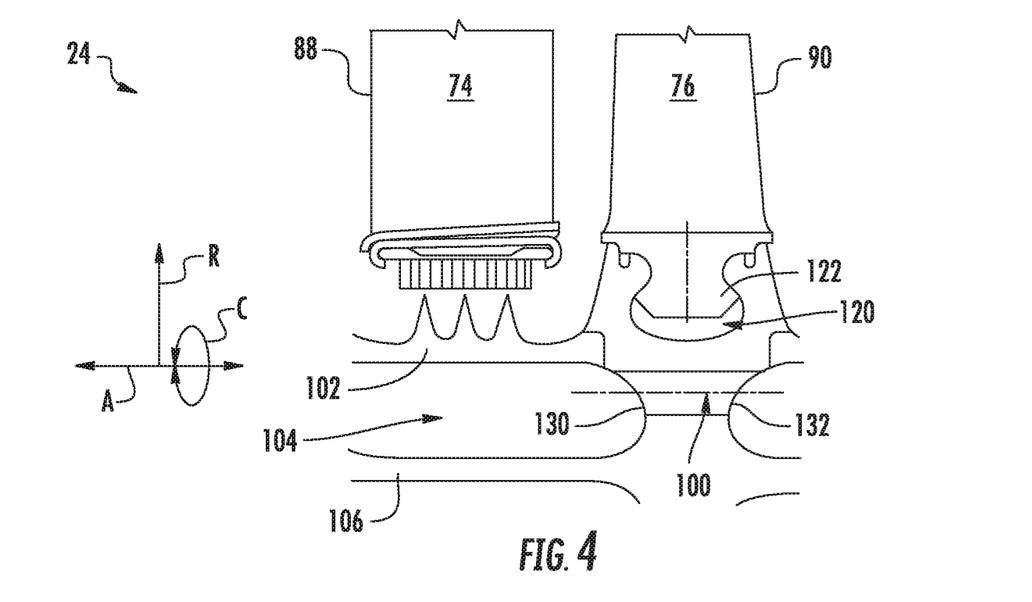
FIG. 4 is a side view of a row of stator vanes and a row of rotor blades in the HP compressor shown in FIG. 2, illustrating a circumferential dovetail, a corresponding circumferential dovetail slot, and a plurality of cooling passages.
Figure 5:
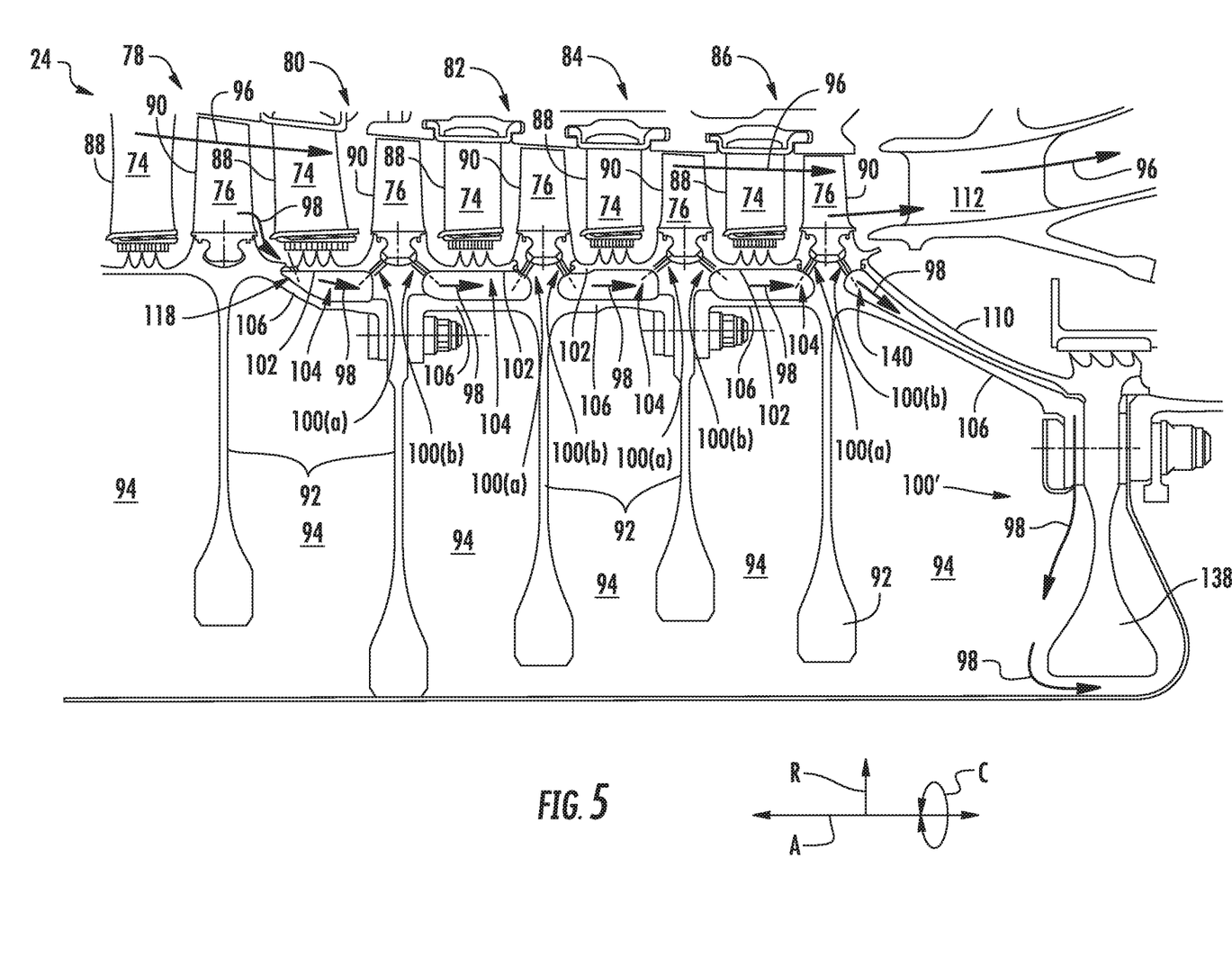
FIG. 5 is a cross-sectional side view of the HP compressor similar to FIG. 2, illustrating another embodiment of the cooling circuit defined thereby.

Referring now to FIGS. 2 and 3, the HP turbine 24 defines one embodiment of a cooling circuit 100. In general, the cooling circuit 100 receives some of the second portion 56 of the air 50 flowing along the compressed gas path 96. The portion of air 50 flowing through the cooling circuit 100 will hereinafter be referred to as cooling air 98. The cooling circuit 100 then circulates the cooling air 98 through various areas of the HP compressor 24 as will be described in greater detail below. The cooling circuit then exhausts the cooling 98 back into the compressed gas path 96 (FIG. 2) or into the HP turbine 28 (FIG. 5).

The cooling circuit 100 includes an intake port 118 defined by and extending radially through one of the labyrinth seals 102. In the embodiment shown in FIG. 2, the intake port 118 is extends through the labyrinth seal 102 in the fourth stage 84. Although, the intake port 118 may extend through the labyrinth seal 102 in any other stage 78, 80, 82, 86 in the HP compressor 24 as well. In the embodiment shown in FIG. 2, the intake port 118 extends radially through the corresponding annular wall 106 as well. In other embodiments, the intake port 118 may extend radially through only the labyrinth seal 102 to provide fluid communication between the compressed gas path 96 and the corresponding cavity 104. The intake port 118 permits some of the second portion 56 of the air 50 flowing through the HP compressor 24 (i.e., the cooling air 98) to enter the cooling circuit 100.

The cooling circuit 100 shown in FIG. 2 further includes a pipe 134 defining a conduit 124 extending therethrough. In particular, the conduit 124 extends between an inlet 128 of the pipe 134 and an outlet 126 of the pipe 134. The inlet 128 couples to and is in fluid communication with the intake port 118. The outlet 124 is positioned radially inwardly from the inlet 128 proximate to the LP shaft 36, which is positioned radially inward of the rotor discs 92. In this respect, the pipe 134 is positioned in the rotor disc space 94 and extends generally radially therein. Alternate embodiments, however, may not include the pipe 134. That is, the intake port 118 may supply the cooling air 98 to the corresponding annular cavity 106 or rotor disc space 94.

The cooling circuit 100 also includes one or more cooling passages 101. Specifically, each of the one or more cooling passages 101 are defined by one of the rotor discs 92. In the embodiment illustrated in FIG. 2, the rotor discs 92 in the second, third, fourth, and fifth stages 80, 82, 84, 86 each define one of the cooling passages 101. In other embodiments, however, more or less of the rotor discs 92 may define the cooling passages 101. In fact, any number of the rotor discs 92 in the HP compressor 24 may define the cooling passages 101 so long as at least one rotor disc 92 defines a cooling passage 101. Furthermore, each rotor disc 92 may define more than one cooling passage 101.

Each of the cooling passages 101 extends axially through the corresponding rotor disc 92. In particular, each cooling passage 101 extends between a first axial side 130 of the rotor disc 92 and a second axial side 132 of the rotor disc 92 positioned axially downstream from the first axial side 130. In this respect, each cooling passage 101 provides fluid communication between each adjacent annular cavity 104. The cooling passage 101 defined by the rotor disc 92 of the fifth stage 86 may be in fluid communication with the conical cavity 140. In the embodiment shown in FIG. 3, the cooling passages 101 are positioned radially inwardly from the axial dovetail slots 114. The cooling passages 101 may also be radially aligned as illustrated in FIG. 2. Furthermore, the cooling passages 101 are positioned radially inwardly from other types of connection slots as well. In some embodiments, such as the one shown in FIG. 3, the cooling passages 101 may be circumferentially spaced apart in the rotor disc 92 and circumferentially aligned with the axial dovetail slots 114. As illustrated in FIG. 3, the cooling passages 101 may have a circular cross-section; although, the cooling passages 101 may have any suitable cross-section (e.g., oval, hemispherical, rectangular, etc.). Some embodiments may not include the cooling passages 101.

Furthermore, the cooling circuit 100 shown in FIG. 2 includes an outlet port 108 defined by and extending radially through one of the labyrinth seals 102. In the embodiment shown in FIG. 2, the outlet port 108 is defined through the labyrinth seal 102 in the second stage 80. Although, the outlet port 108 may be defined through the labyrinth seal 102 in any other stage 78, 82, 84, 86 in the HP compressor 24 as well. In the embodiment shown in FIG. 2, the outlet port 108 permits fluid communication between the compressed gas path 96 and the corresponding annular cavity 104. As such, the outlet port 108 permits the cooling air 98 to exit the cooling circuit 100.

In operation, the cooling air 98 flows through the cooling circuit 100, thereby cooling various areas of the HP compressor 24. In the embodiment shown in FIG. 3, the cooling air 98 enters the cooling circuit 100 via the intake port 118 before flowing radially inwardly through the conduit 124. After exiting the outlet 126 of the conduit 124 at a position radially inward of at least some of the rotor discs 92, the cooling air 98 flows axially downstream to the CDP seal 138 along the LP shaft 36 or any other components positioned radially between the rotor discs 92 and the LP shaft 36. The cooling air 98 then flows radially outwardly and into the conical cavity 140. From the conical cavity 140, the cooling air 98 flows through the cooling passage 101 in the fifth stage 86 rotor disc 92 into the annular cavity 104 axially aligned with the fifth stage 86 stator vanes 74. Next, the cooling air 98 flows through the cooling passage 101 in the fourth stage 84 rotor disc 92 into the annular cavity 104 axially aligned with the fourth stage 84 stator vanes 74. Then, the cooling air 98 flows through the cooling passage 101 in the third stage 82 rotor disc 92 into the annular cavity 104 axially aligned with the third stage 82 stator vanes 74. The cooling air 98 then flows through the cooling passage 101 in the second stage 80 rotor disc 92 into the annular cavity 104 axially aligned with the second stage 80 stator vanes 74. The cooling air 98 then exits the cooling circuit 100 through the outlet port 108 and flows back into the compressed gas path 96.

In the embodiments that do not include the cooling passages 101, the cooling air 98 may flow through an axial connection slot passage 142 of the axial connection slot 114. As illustrated in FIG. 3, the axial connection portion 122 may not fill the entire axial connection slot 114. In this respect, the axial connection slot passage 142 is formed in the axial connection slot 114. As such, the cooling air 98 may flow through the axial connection slot passage 142 in the same manner as the cooling passages 101. The cooling air 98 may flow through the axial connection slot passages 142 in addition to or in lieu of the cooling passages 101.

In this respect, the cooling air 98 flowing through the cooling circuit 100 absorbs heat from the rotor discs 92, labyrinth seals 102, stator vanes 74, and/or rotor blades 76, thereby cooling the same. This permits the HP compressor 24 to operate at higher temperatures than conventional HP compressors, thereby allowing the turbofan 10 operate with a higher OPR.

In the embodiment shown in FIG. 2, the cooling air 98 flows through the cooling passages 101 in the upstream direction (i.e., relative to the direction of flow in the compressed gas path 96). That is, the cooling air 98 flows from the second axial side 132 of the rotor disc 92 to the first axial side 130 of the rotor disc 92, which is positioned axially upstream of the second axial side 132. In other embodiments, however, the cooling air 98 may flow downstream (i.e., relative to the flow through the compressed gas path 96) through the cooling passages 101.

Furthermore, the outlet port 108 is positioned axially upstream of the intake port 118 in the embodiment illustrated in FIG. 2. In alternate embodiments, however, the outlet port 108 may be positioned axially downstream of the intake port 118 as well.

Figure 6:
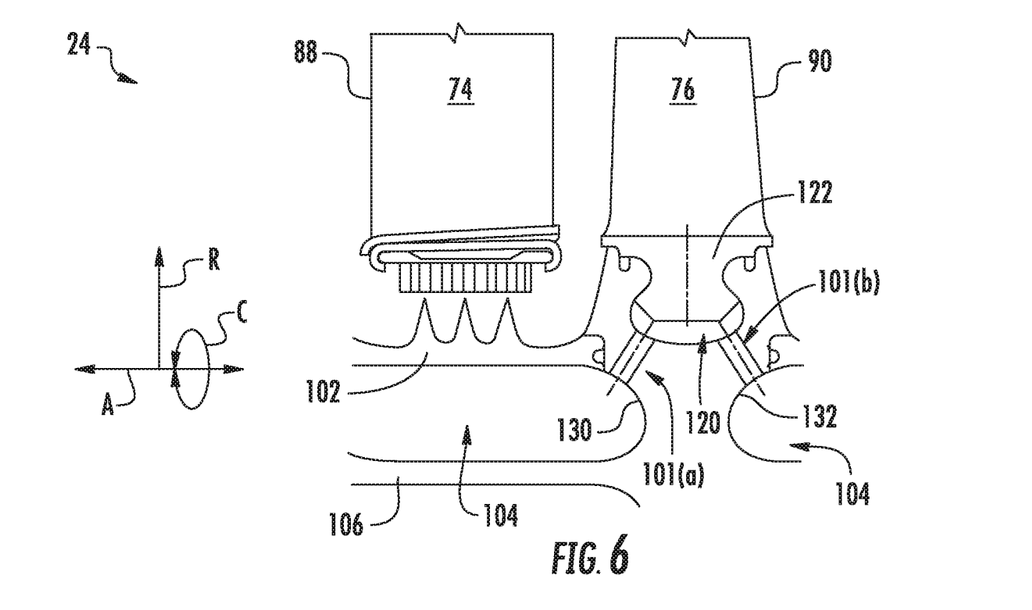
FIG. 6 is a side view of a row of stator vanes and a row of rotor blades in the HP compressor similar to FIG. 4, illustrating the circumferential dovetail, the corresponding circumferential dovetail slot, and an alternate embodiment of the plurality of cooling passages.

FIGS. 5 and 6 illustrate an alternate embodiment of the cooling circuit 100' defined by the HP compressor 24. In particular, the cooling air 98 flows generally downstream (i.e., relative to direction of flow in the compressed gas path 96) through the cooling circuit 100' and is exhausted into the HP turbine 28. In this respect, the cooling circuit 100' does not include an outlet port 108 defined by one of the labyrinth seals 102 in the HP compressor 24. Furthermore, the intake port 118 is positioned at a generally upstream portion (i.e., relative to the cooling circuit 100) of the HP compressor 24 (e.g., in the second stage 80 in the embodiment shown in FIG. 5). The HP compressor 24 depicted in FIG. 5 is substantially the same as depicted in FIG. 2.

An alternate embodiment of the cooling passages is shown in FIGS. 5 and 6. More specifically, each of the rotor discs 92 define a first cooling passage portion 101(a) and a second cooling passage portion 101(b). The first cooling passage portion 101(a) extends between the first axial side 130 of the rotor disc 92 and the circumferential dovetail slot 120. In a similar manner, the second cooling passage portion 101(b) extends between the circumferential dovetail slot 120 and the second axial side 132 of the rotor disc 92. In this respect, the first cooling passage portion 101(a) fluidly couples the adjacent annular cavity 104 upstream of the corresponding rotor disc 92 and the circumferential dovetail slot 120 defined thereby. Similarly, the second cooling passage portion 100(b) fluidly couples the adjacent annular cavity 104 downstream of the corresponding rotor disc 92 and the circumferential dovetail slot 120 defined thereby. In the embodiment shown in FIG. 6, the first and the second cooling passage portions 101(a), 101(b) extend angularly radially outwardly toward the circumferential dovetail slot 120. In alternate embodiments, the cooling circuit 100' may include the cooling passages 101 shown in FIGS. 2 and 4 in place of or in addition to the first and the second cooling passages portions 101(a), 101(b).

In operation, the cooling air 98 flows through the cooling circuit 100' to cool various areas of the HP compressor 24 much like the cooling circuit 100. In particular, the cooling air 98 enters the cooling circuit 100', and more specifically the annular cavity 104 axially aligned with the second stage 80 stator vanes 74, via the intake port 118. The cooling air 98 then flows through the first cooling passage portion 101(a), the circumferential dovetail slot 120, and second cooling passage portion 101(b) defined by the second stage 80 rotor disc 92 and into the annular cavity 104 axially aligned with the third stage 82 stator vanes 74. Next, the cooling air 98 flows through the first cooling passage portion 101(a), the circumferential dovetail slot 120, and second cooling passage portion 101(b) defined by the third stage 82 rotor disc 92 and into the annular cavity 104 axially aligned with the fourth stage 84 stator vanes 74. Then, the cooling air 98 flows through the first cooling passage portion 101(a), the circumferential dovetail slot 120, and second cooling passage portion 101(b) defined by the fourth stage 84 rotor disc 92 and into the annular cavity 104 axially aligned with the fifth stage 86 stator vanes 74. The cooling air 98 next flows through the first cooling passage portion 101(a), the circumferential dovetail slot 120, and second cooling passage portion 101(b) defined by the fifth stage 86 rotor disc 92 and into the conical cavity 140. After flowing through the conical cavity 140, the cooling air 98 flows radially inwardly through the rotor disc space 94 between the fifth stage 86 rotor disc 92 and the CDP seal 138 before flowing axially downstream between the CDP seal 138 and the LP shaft 36 to the HP turbine 28.

In the embodiment shown in FIG. 5, the cooling air 98 flows through the cooling passages 101 in the downstream direction (i.e., relative to the direction of flow in the compressed gas path 96). That is, the cooling air 98 flows from the first axial side 130 of the rotor disc 92 to the second axial side 132 of the rotor disc 92, which is positioned axially downstream of the first axial side 130.

While the cooling circuits 100, 100' are described below in the context of various embodiments of the HP compressor 24, the cooling circuits 100, 100' may also be used in the LP compressor 22, the HP turbine 28, and/or the LP turbine 30 as well.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A cooling circuit for a gas turbine engine, comprising:
   a rotor blade comprising a connection portion; and
   a rotor disc comprising a first axial side and a second axial side, the rotor disc defining a connection slot and a cooling passage extending between the first axial side and the second axial side, the cooling passage being positioned radially inwardly of a radially inner surface of the connection slot; and
   a spacer coupled to the rotor disc and in sliding contact with a row of stator vanes, the spacer defining an intake port extending therethrough and in fluid communication with the cooling passage;
   wherein the connection slot receives the connection portion to couple the rotor blade to the rotor disc; and
   wherein cooling air flows through the cooling passage.

2. The cooling circuit of claim 1, wherein the rotor blade and the rotor disc are positioned in a high pressure compressor portion of the gas turbine engine.

3. The cooling circuit of claim 1, wherein the connection portion is a dovetail and the connection slot is a dovetail slot.

4. The cooling circuit of claim 3, wherein the dovetail slot is an axial dovetail slot.

5. The cooling circuit of claim 3, wherein the dovetail slot is a circumferential dovetail slot.

6. The cooling circuit of claim 5, wherein the cooling passage comprises a first portion that extends between the first axial side and a radially inner surface of the circumferential dovetail slot and a second portion that extends between the radially inner surface of the circumferential dovetail slot and the second axial side, and wherein cooling air flows through the first portion of the cooling passage, the circumferential dovetail slot, and the second portion of the cooling passage.

7. The cooling circuit of claim 1, wherein the cooling air is bled from a compressor portion of the gas turbine engine.

8. The cooling circuit of claim 1, wherein the rotor blade comprises a plurality of circumferentially spaced apart rotor blades; wherein the connection slot comprises a plurality of circumferentially spaced apart connection slots, each of the plurality of circumferentially spaced apart connection slots receiving one of the circumferentially spaced apart rotor blades; and wherein the cooling passage comprises a plurality of cooling passages.

9. The cooling circuit of claim 8, wherein each of the plurality of cooling passages is circumferentially spaced apart.

10. The cooling circuit of claim 1, wherein the cooling passage is spaced apart from the connection slot.

11. A gas turbine engine, comprising:
    a combustion section;
    a turbine section; and
    a compressor section, comprising:
      a plurality of rows of stator vanes;
      a plurality of rows of rotor blades, each rotor blade comprising a connection portion, wherein the plurality of rows of stator vanes and the row plurality of rows of rotor blades define a compressed gas path;
      a plurality of rotor discs, each rotor disc comprising a first axial side and a second axial side, each rotor disc defining a cooling passage extending between the first axial side and the second axial side, the cooling passages of each of the plurality of rotor discs being radially aligned, each rotor disc further defining one or more connection slots that receive the connection portions of a portion of the rotor blades to couple the portion of the rotor blades to the rotor disc; and a spacer coupled to one of the plurality of rotor discs and in sliding contact with one of the plurality of rows of stator vanes, the spacer being positioned axially between two of the plurality of rows of rotor blades, the spacer defining an intake port extending therethrough and in fluid communication with the cooling passage;

wherein cooling air from the compressed gas path flows through the intake port into the cooling passages.

12. The gas turbine engine of claim 11, wherein the first axial side is positioned upstream of the second axial side, and wherein the cooling air flows through the cooling passage from the first axial side to the second axial side.

13. The gas turbine engine of claim 11, wherein the first axial side is positioned upstream of the second axial side, and wherein the cooling air flows through the cooling passage from the second axial side to the first axial side.

14. The gas turbine engine of claim 11, wherein the cooling passage comprises a first portion that extends between the first axial side and the connection slot and a second portion that extends between the connection slot and the second axial side, and wherein cooling air flows through the first portion of the cooling passage, the connection slot, and the second portion of the cooling passage.

15. The gas turbine engine of claim 11, further comprising: an annular wall positioned radially inwardly from the spacer that couples two of the plurality of rotor discs, wherein the annular wall, the spacer, and the two rotor discs collectively define a cavity in fluid communication with the intake port and the cooling passages of the two rotor discs.

16. The gas turbine engine of claim 11, wherein the spacer comprises a first spacer and a second spacer positioned downstream from the first spacer, and wherein the first spacer defines an outlet port and the second spacer defines an intake port in fluid communication with the outlet port.

17. A gas turbine engine, comprising:
a combustion section;
a turbine section; and
a compressor section, comprising:
a row of stator vanes;
a row of rotor blades, each rotor blade comprising a connection portion, wherein the row of stator vanes and the row of rotor blades define a compressed gas path;
a rotor disc comprising a first axial side and a second axial side, the rotor disc defining a cooling passage extending between the first axial side and the second axial side and one or more connection slots that receive the connection portions of the rotor blades to couple the rotor blades to the rotor disc;
a spacer coupled to the rotor disc and in sliding contact with the row of stator vanes, the spacer defining an intake port extending therethrough and in fluid communication with the cooling passage;
a conduit in fluid communication with and extending radially inwardly from the intake port; and
a conical flange,
wherein cooling air from the compressed gas path flows through the intake port into the cooling passage,
wherein the cooling air flows from the intake port through the conduit to a position radially inward of the rotor disc, and wherein the cooling air flows radially
outwardly from the position radially inward of the rotor disc to the cooling passage, and wherein the cooling air flows along the conical flange from the position radially inward of the rotor disc to the cooling passage.

* * * * *